United States Patent
Zhang et al.

(10) Patent No.: US 12,407,170 B2
(45) Date of Patent: Sep. 2, 2025

(54) PID EFFECT SUPPRESSION SYSTEM

(71) Applicant: GINLONG TECHNOLOGIES CO., LTD., Ningbo (CN)

(72) Inventors: Wenping Zhang, Ningbo (CN); Yiming Wang, Ningbo (CN); Po Xu, Ningbo (CN); Wanshuang Lin, Ningbo (CN); Baosong Liu, Ningbo (CN)

(73) Assignee: GINLONG TECHNOLOGIES CO., LTD., Ningbo (CN)

( * ) Notice: Subject to any disclaimer, the term of this patent is extended or adjusted under 35 U.S.C. 154(b) by 0 days.

(21) Appl. No.: 18/690,431

(22) PCT Filed: Aug. 24, 2023

(86) PCT No.: PCT/CN2023/114698
§ 371 (c)(1),
(2) Date: Mar. 8, 2024

(87) PCT Pub. No.: WO2024/066832
PCT Pub. Date: Apr. 4, 2024

(65) Prior Publication Data
US 2025/0226665 A1 Jul. 10, 2025

(30) Foreign Application Priority Data
Sep. 30, 2022 (CN) .................... 202211209201.3

(51) Int. Cl.
*H02J 3/38* (2006.01)
*H02S 40/36* (2014.01)

(52) U.S. Cl.
CPC ............. *H02J 3/38* (2013.01); *H02S 40/36* (2014.12); *H02J 2300/24* (2020.01)

(58) Field of Classification Search
CPC ......... H02J 3/38; H02J 2300/24; H02S 40/36
See application file for complete search history.

(56) References Cited

U.S. PATENT DOCUMENTS

2017/0294875 A1* 10/2017 Xu .............................. H02J 3/38
2019/0305552 A1* 10/2019 Cao ..................... H02M 7/5387

FOREIGN PATENT DOCUMENTS

| CN | 104242349 A | 12/2014 | |
| CN | 104795985 A * | 7/2015 | ............. Y02E 10/56 |

(Continued)

OTHER PUBLICATIONS

ISR of PCT/CN2023/114698.
(Continued)

*Primary Examiner* — Jared Fureman
*Assistant Examiner* — Duc M Pham
(74) *Attorney, Agent, or Firm* — Hemisphere Law, PLLC; Zhigang Ma

(57) ABSTRACT

The present disclosure provides a PID (Potential Induced Degradation) effect suppression system. The PID effect suppression system includes a photovoltaic system, at least one voltage source topology module and a balanced circuit. The photovoltaic system is connected with a power grid. An output end of the voltage source topology module is connected with busbar neutral points of the photovoltaic system. A common earth end of the voltage source topology module is earthed, and then the potential to earth of a photovoltaic panel group in the photovoltaic system is improved through the suppression voltage output by the voltage source topology module, and the suppression voltage is greater than ½ of the output voltage of the photovoltaic panel group. Therefore, a PID effect of the photovoltaic system in operation can be effectively suppressed. When the voltage source topology module gets power from busbars, the balanced circuit can be connected between the output end of the voltage source topology module and the common earth end. If deviation occurs on the busbar voltage of the photovoltaic system, the balanced circuit is connected with the voltage (Continued)

source topology module, so that the deviation voltage generated by the busbars can be effectively balanced to ensure normal operation of the photovoltaic system under the suppression of the PID effect.

9 Claims, 13 Drawing Sheets

(56) References Cited

FOREIGN PATENT DOCUMENTS

| | | | |
|---|---|---|---|
| CN | 212543724 A | 2/2021 | |
| CN | 114400913 A | 4/2022 | |
| CN | 115276549 | 11/2022 | |
| JP | 2002058166 A | 2/2002 | |
| WO | WO-2018171765 A1 * | 9/2018 | ............... H02J 3/383 |

OTHER PUBLICATIONS

CNIPA, Notification of First Office Action for Chinese application CN202211209201.3, Nov. 15, 2022.
CNIPA, Notification to grant patent right for Chinese application CN202211209201.3, Dec. 6, 2022.

* cited by examiner

PID EFFECT SUPPRESSION SYSTEM

TECHNICAL FIELD

The present disclosure relates to the technical field of photovoltaic power generation, in particular to a PID (Potential Induced Degradation) effect suppression system.

BACKEARTH

The PID effect refers to photovoltaic potential induced degradation effect in the photovoltaic system. There is leakage current between glass and the packaging materials under the action of high voltage for a long time, and a large number of charges are gathered on the surface of the battery, so that the passivation effect on the surface of the battery becomes poor. When the PID effect is serious, the power of a battery module is attenuated by more than 50%, so that the power output of the whole battery string is influenced. Therefore, when the photovoltaic system operates, the PID effect of the photovoltaic system needs to be suppressed.

The existing main suppression methods of PID effect are as follows.

Firstly, a power supply is installed between the photovoltaic cell and the earth, and the output voltage of the power supply is adjusted in a closed loop, so that the voltage to earth of the photovoltaic negative electrode can be compensated, and the purpose of suppressing PID effect is achieved.

Secondly, the voltage to earth of the neutral points on the alternating current side of photovoltaic system is increased by installing a voltage increasing circuit, so that the voltage to earth of the previous battery panel of the inverter is increased.

When the two methods are used, the implementation process is more difficult, and the structure of the suppression circuit is more complex. And, the busbar voltage imbalance of the photovoltaic system is easily caused while the PID effect of the photovoltaic system is suppressed, and then the normal work of the photovoltaic system is influenced. Therefore, a novel PID effect suppression system is urgently needed at present.

SUMMARY

One of the purposes of the present disclosure is to provide a system capable of suppressing a PID effect of a photovoltaic system and balancing busbar voltage.

In order to achieve the purpose, the technical scheme adopted by the present disclosure is as follows. A PID effect suppression system includes a photovoltaic system, at least one voltage source topology module and a balanced circuit. The photovoltaic system is connected with a power grid. An output end of the voltage source topology module is connected with busbar neutral points of the photovoltaic system. A common earth end of the voltage source topology module is earthed, and then the potential to earth of a photovoltaic panel group in the photovoltaic system is improved through the suppression voltage output by the voltage source topology module, and the suppression voltage is at least ½ of the output voltage of the photovoltaic panel group. The balanced circuit can be connected between the output end of the voltage source topology module and the common earth end. When the voltage source topology module gets power from the busbars, if deviation occurs on the voltage of the busbar neutral points of the photovoltaic system, the balanced circuit is suitable for being connected to the voltage source topology module, and then the deviation voltage of the busbars is balanced.

Preferably, the photovoltaic system comprises a plurality of photovoltaic panel groups and an inverter; the photovoltaic panel groups are connected to an input end of the inverter through the same busbar by means of a DC/DC (Direct Current/Direct Current) converter, and an output end of the inverter is connected to the power grid. The output end of the voltage source topology module is directly connected with the busbar neutral points of the photovoltaic system.

Preferably, the photovoltaic system includes a plurality of photovoltaic panel groups and a plurality of inverters. The photovoltaic panel groups are connected with the corresponding inverters through busbars by means of a DC/DC converter to form photovoltaic circuits, and the photovoltaic circuits are connected to the power grid in parallel. The output end of the voltage source topology module is connected with busbar neutral points of each photovoltaic circuit by means of control switches. When the voltage source topology module operates, one of the control switches is closed, and the rest of the control switches keep disconnected.

Preferably, the voltage source topology module includes a suppression circuit formed by connecting a transformer and an uncontrolled rectifier bridge. An input end of the suppression circuit is connected with the power grid, an output end of the suppression circuit is connected with the busbar neutral points of the photovoltaic system, and a common earth end of the suppression circuit is earthed, so that the voltage of the power grid forms the suppression voltage after passing through the transformer and the uncontrolled rectifier bridge.

Preferably, the suppression circuit also includes a Boost circuit. The voltage of the power grid forms the suppression voltage after passing through the transformer, the uncontrolled rectifier bridge and the Boost circuit, and the value of the suppression voltage can be adjusted to a suitable value by regulating the duty ratio of the Boost circuit.

Preferably, the voltage source topology module includes a suppression circuit formed by connecting a full bridge circuit, a transformer and an uncontrolled rectifier bridge in sequence. An input end of the suppression circuit is connected with busbars of the photovoltaic system, an output end of the suppression circuit is connected with busbar neutral points of the photovoltaic system, and a common earth end of the suppression circuit is earthed, so that the busbar voltage of the photovoltaic system forms the suppression voltage after passing through the full bridge circuit, the transformer and the uncontrolled rectifier bridge.

Preferably, the voltage source topology module includes a suppression circuit formed by a Buck/Boost circuit. An input end of the suppression circuit is connected with positive busbars, an output end of the suppression circuit is earthed, and common earth points of the suppression circuit are connected to the busbar neutral points of the photovoltaic system. Or, the voltage source topology module comprises a suppression circuit formed by a Buck circuit. An input end of the suppression circuit is connected with negative busbars, an output end of the suppression circuit is connected with busbar neutral points of the photovoltaic system, and common earth points of the suppression circuit are earthed.

Preferably, the balanced circuit includes a path unit and a load. When voltage deviation occurs on positive busbars or negative busbars, the path unit is suitable for connecting the load with a suppression circuit formed by the corresponding voltage source topology module.

Preferably, the path unit is a selector switch, and the selector switch is connected with the load in parallel. The number of the voltage source topology modules is two, an input end of the suppression circuit corresponding to one voltage source topology module is connected to the positive busbars, and an input end of the suppression circuit corresponding to the other voltage source topology module is connected to the negative busbars. The output ends of the two suppression circuits and the common earth end are connected in parallel through the balanced circuit. When deviation occurs on the voltage of the positive busbars or the negative busbars, the balanced circuit is connected by turning on and off the selector switch, and then the voltage of the positive busbars or the negative busbars is balanced.

Preferably, the path unit includes a pair of diodes. The number of the voltage source topology modules is two, an input end of the suppression circuit corresponding to one voltage source topology module is connected to the positive busbars, and an input end of the suppression circuit corresponding to the other voltage source topology module is connected to the negative busbars. The diodes are installed at the output ends of the two suppression circuits, and two output ends of the suppression circuit and the common earth end are connected in parallel through the load. When high deviation occurs on the voltage of the positive busbars or the negative busbars, the suppression circuit corresponding to the busbars without high voltage deviation is turned off through the corresponding diode, so that the balanced circuit is connected with the suppression circuit corresponding to the busbars with high voltage deviation, and then the voltage of the positive busbars or the negative busbars is balanced.

Compared the prior art, the present disclosure has the following beneficial effects.

Firstly, a voltage source topology module is connected between the busbar neutral points and the earth in the present disclosure, so that the potential to earth of the neutral points of the busbar voltage is increased, and then the potential to earth of the previous photovoltaic panel group is increased to suppress the PID effect. At the same time, the balanced circuit is arranged to be connected with the voltage source topology module, the deviation voltage of the busbars can be balanced through the connection of the balanced circuit after the PID effect is suppressed.

Secondly, the balanced circuit can be connected to the output end of the voltage source topology circuit in the present disclosure, so that the voltage source topology circuit can not only suppress the PID effect, but also adjust the busbar voltage of the photovoltaic system.

Thirdly, there are many construction methods of the voltage source topology module in the present disclosure, isolated circuit or non-isolated circuit can be adopted, and power can be got from alternating current or direct current. Therefore, the application range of the voltage source topology module in the present disclosure can be enlarged.

Figure 1:
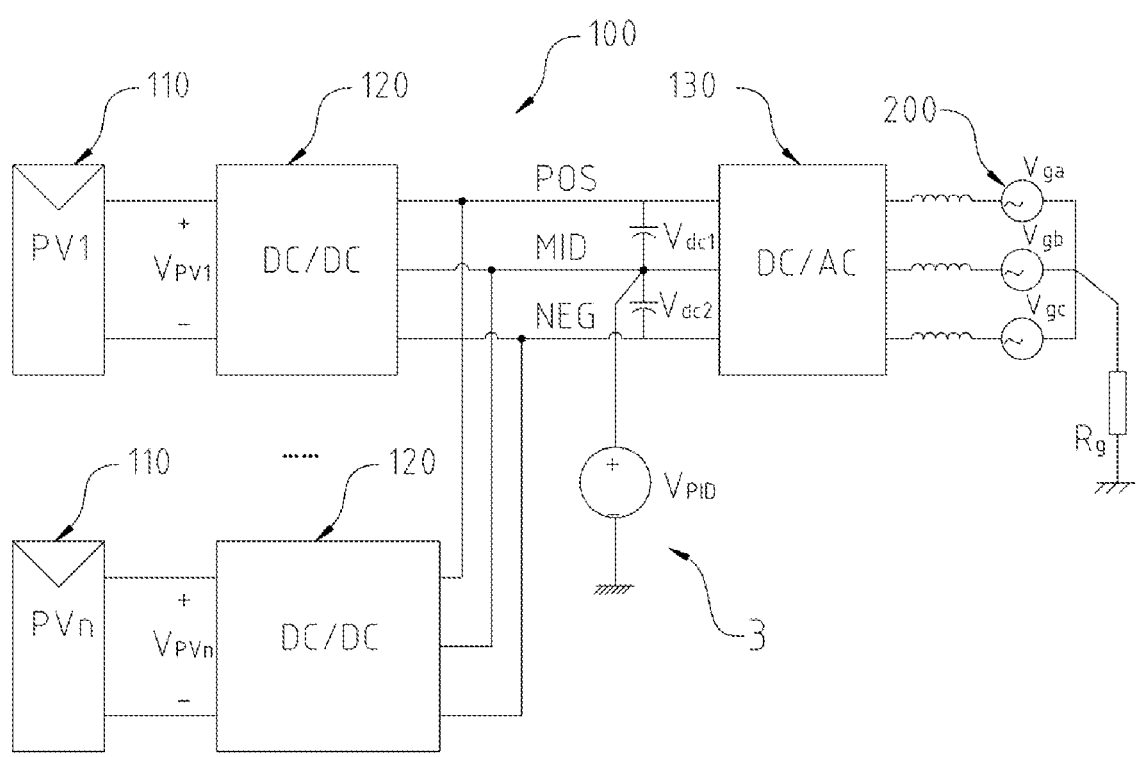
FIG. 1 is a schematic diagram of a circuit in a first embodiment of the present disclosure.

Reference signs: 100, photovoltaic system; 110, photovoltaic panel group; 120, DC/DC converter; 130, inverter; 200, power grid; 3, voltage source topology module; 31, transformer; 32, uncontrolled rectifier bridge; 33, full bridge circuit; 34, Boost circuit; 301, output end; 302, common earth end; 4, balanced circuit; 41, load; 42, selector switch; and 43, diode.

DETAILED DESCRIPTION OF THE EMBODIMENTS

In the following, the present disclosure is further described with the attached figures and specific embodiments. It should be noted that the following embodiments or technical features can be arbitrarily combined to form a new embodiment without conflict.

In the description of the present disclosure, it needs to be illustrated that for location words, the indicative direction or position relations of the terms such as "center", "transverse", "longitudinal", "length", "width", "thickness", "upper", "lower", "front", "rear", "left", "right", "vertical", "horizontal", "top", "bottom", "inside", "outside", "clockwise" and "anti-clockwise" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure.

It needs to be noted that in the specification and claims of the present disclosure, the terms such as "first" and "second" are intended to distinguish between similar objects but do not necessarily indicate a specific order or sequence.

In one of preferred embodiments of the present disclosure, as shown in FIG. 1 to FIG. 13, a PID effect suppression system includes a photovoltaic system 100, at least one voltage source topology module 3 and a balanced circuit 4. The photovoltaic system 100 is connected with a power grid 200. An output end 301 of the voltage source topology module 3 is connected with busbar neutral points of the photovoltaic system 100. A common earth end 302 of the voltage source topology module 3 is earthed, and then the potential to earth of a photovoltaic panel group 110 in the photovoltaic system 100 is improved through the suppression voltage output by the voltage source topology module 3. Wherein, the suppression voltage is at least ½ of the output voltage of the photovoltaic panel group 110. When the voltage source topology module 3 gets power from busbars of the photovoltaic system 100, the balanced circuit 4 can be connected between the output end 301 of the voltage source topology module 3 and the common earth end 302. If deviation occurs on the busbar voltage of the photovoltaic system 100, the balanced circuit 4 can be connected with the voltage source topology module 3, and then the deviation voltage of the busbars is balanced.

It is understandable that the potential of the busbar neutral points of the photovoltaic system 100 should theoretically be half of the output voltage of the photovoltaic panel group 110 when the photovoltaic system 100 operates normally. With continuous operation of the photovoltaic system 100, the photovoltaic system 100 is subjected to a PID effect, resulting in the attenuation of the busbar voltage of the photovoltaic system 100. At this time, through the voltage source topology module 3, it can be ensured that the potential of the busbar neutral points of the photovoltaic system 100 is kept at more than half of the output voltage of the photovoltaic panel group 110, and then the negative potential to earth of the photovoltaic panel group 110 can be increased, thus realizing the suppression of the PID effect.

In the embodiment, the installation methods of the voltage source topology module 3 are related to the structure of the photovoltaic system 100, including but not limited to the two following installation methods.

In the first installation method, as shown in FIG. 1, the photovoltaic system 100 includes a plurality of photovoltaic panel groups 110 and an inverter 130. Each photovoltaic panel group 110 can be connected to an input end of the inverter 130 through the same busbar by means of a DC/DC converter 120, and an output end 301 of the inverter 130 is connected to the power grid 200. At this time, the output end 301 of the voltage source topology module 3 can be directly connected to the busbar neutral points of the photovoltaic system 100.

Figure 2:
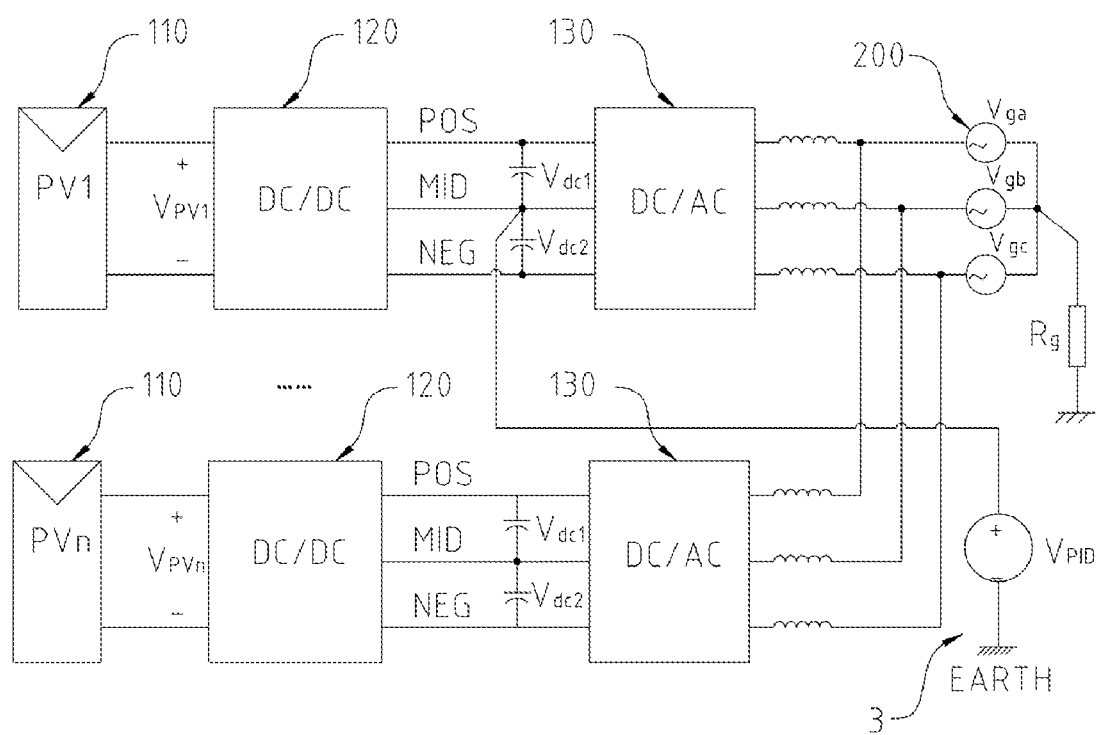
FIG. 2 is a schematic diagram of a circuit in a second embodiment of the present disclosure.
Figure 3:
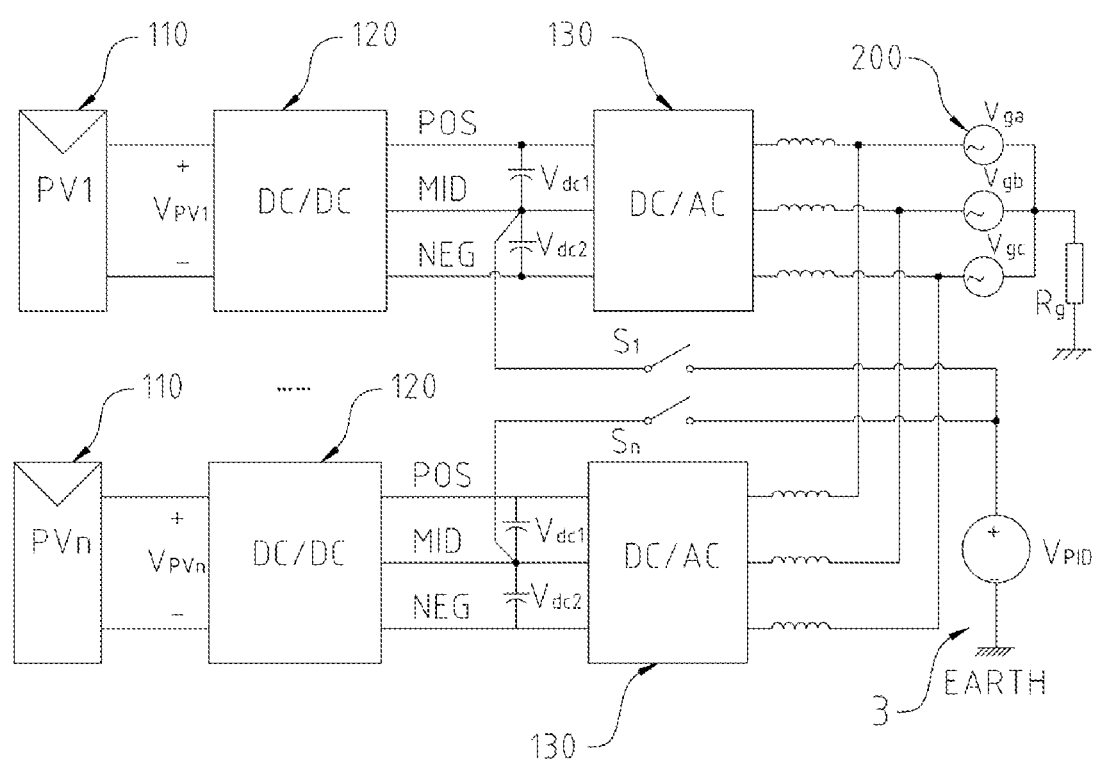
FIG. 3 is a schematic diagram of a circuit in a third embodiment of the present disclosure.

In the second installation method, as shown in FIG. 2 and FIG. 3, the photovoltaic system 100 includes a plurality of photovoltaic panel groups 110 and a plurality of inverters 130. Each photovoltaic panel group 110 can be connected to a corresponding inverter 130 through busbars by means of a DC/DC converter 120 to form a photovoltaic circuit. The photovoltaic circuits are connected in parallel to the power grid 200. The output terminal 301 of the voltage source topology module 3 is connected with the busbar neutral points of each photovoltaic circuit through a control switch. When the voltage source topology module 3 operates, one of the control switches is closed, and the rest of the control switches remain disconnected.

It is understandable that in the second installation method, when the PID effect of the photovoltaic system 100 is suppressed, it is only necessary to install the voltage source topology module 3 at the busbar neutral points of one of the photovoltaic circuits. Since the alternating current sides of all inverters 130 are connected together, when the potential to earth of the busbar neutral points of one of the photovoltaic circuits is increased, the voltage to earth of the busbar neutral points of all other photovoltaic circuits can be increased accordingly.

At this time, the output end 301 of the voltage source topology module 3 can be connected by only the busbar neutral points of any one of the photovoltaic circuits. However, when the photovoltaic circuit connected with the voltage source topology module 3 fails, the voltage source topology module 3 can lose the suppression on the PID effect of other photovoltaic circuits. Therefore, the output end 301 of the voltage source topology module 3 can be connected to the busbar neutral points of each photovoltaic circuit through the control switches. Therefore, when the photovoltaic system 100 operates, only one of the control switches needs to be closed, and the rest of the control switches are disconnected, so that the voltage source topology module 3 can be connected into the photovoltaic system 100 to suppress the PID effect. When the photovoltaic circuit connected with the voltage source topology module 3 fails, only the control switch connected with the failed photovoltaic circuit needs to be disconnected, and any one of the control switches connected between the voltage source topology module 3 and the photovoltaic circuit without failure is closed, so as to ensure that the voltage source topology module 3 can continue to suppress the PID effect of the photovoltaic circuit without failure.

Wherein, the control switches are the prior art, and common control switches include contactors, air switches, controllable electronic switches and the like.

The construction of voltage source topology module 3 can be divided into adjustable construction, non-adjustable construction, isolated construction, non-isolated construction and other construction methods. Six preferred construction methods can be given below, but the construction of the voltage source topology module 3 in the present disclosure includes, but not limited to, the six following construction methods.

Figure 4:
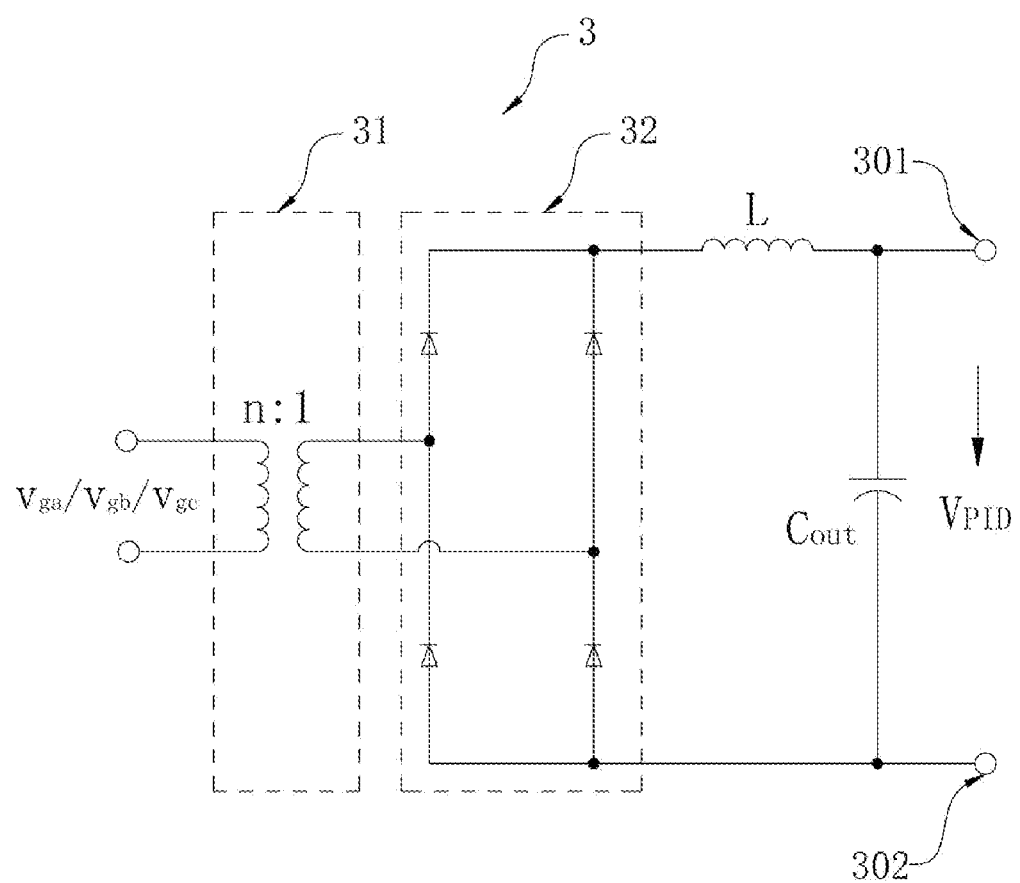
FIG. 4 is a schematic diagram of a circuit in a first construction manner of a voltage source topology module in the present disclosure.
Figure 9:
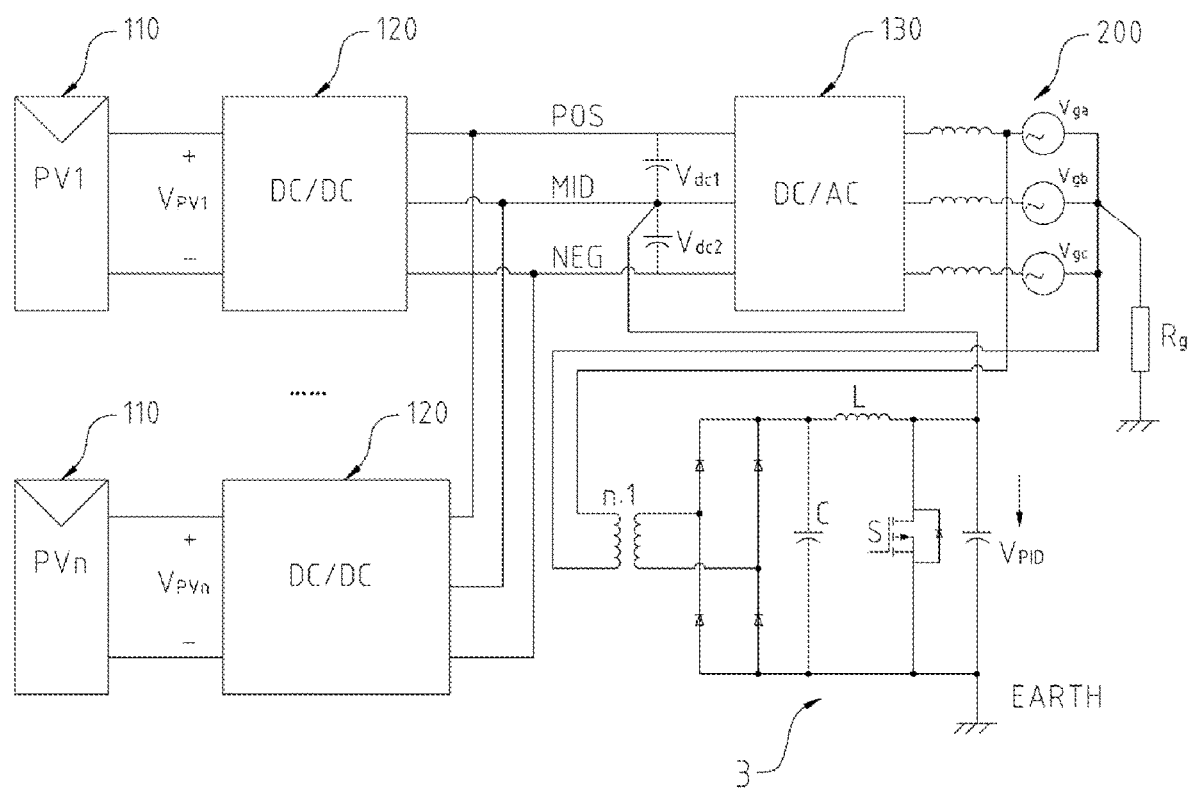
FIG. 9 is a schematic diagram of a circuit that a voltage source topology module is connected with a photovoltaic system as shown in FIG. 6 in the present disclosure.

The first construction method is an isolated and non-adjustable construction method. As shown in FIG. 4 and FIG. 9, the voltage source topology module 3 includes a suppression circuit formed by connecting a transformer 31 and an uncontrolled rectifier bridge 32. An input end of the suppression circuit is connected with the power grid 200, an output end 301 of the suppression circuit is connected with the busbar neutral points of the photovoltaic system 100, and a common earth end 302 of the suppression circuit is earthed, so that the voltage of the power grid 200 forms the suppression voltage after passing through the transformer 31 and the uncontrolled rectifier bridge 32.

For the first construction method, the power of the voltage source topology module 3 comes from the power grid 200. Since the transformer ratio of the transformer 31 is constant, the value of the suppression voltage of the power grid 200 output from the output end 301 through the suppression circuit is a constant value. Since the value of the suppression voltage is unadjustable, the design of the transformer 31 is very important. It is necessary to ensure that the suppression voltage output by the suppression circuit is at least half of the output voltage of the photovoltaic panel group 110 under various operating conditions. Meanwhile, the power of the voltage source topology module 3 comes from the power grid 200, so the transformer 31 can be an industrial frequency transformer selectively.

Figure 5:
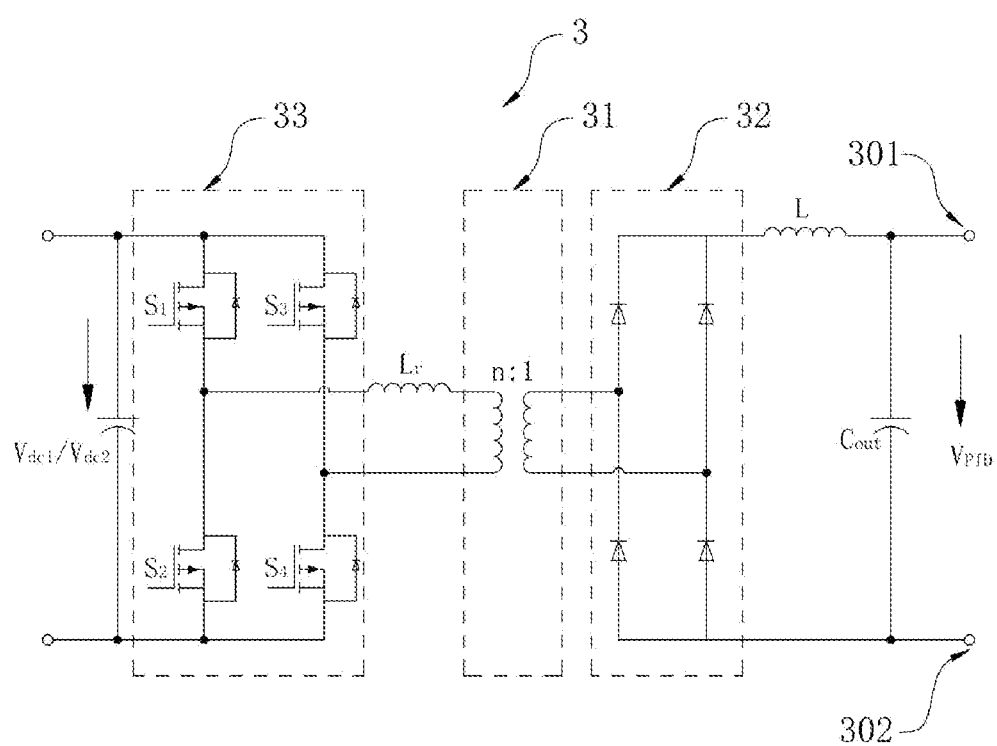
FIG. 5 is a schematic diagram of a circuit in a second construction manner of a voltage source topology module in the present disclosure.
Figure 10:
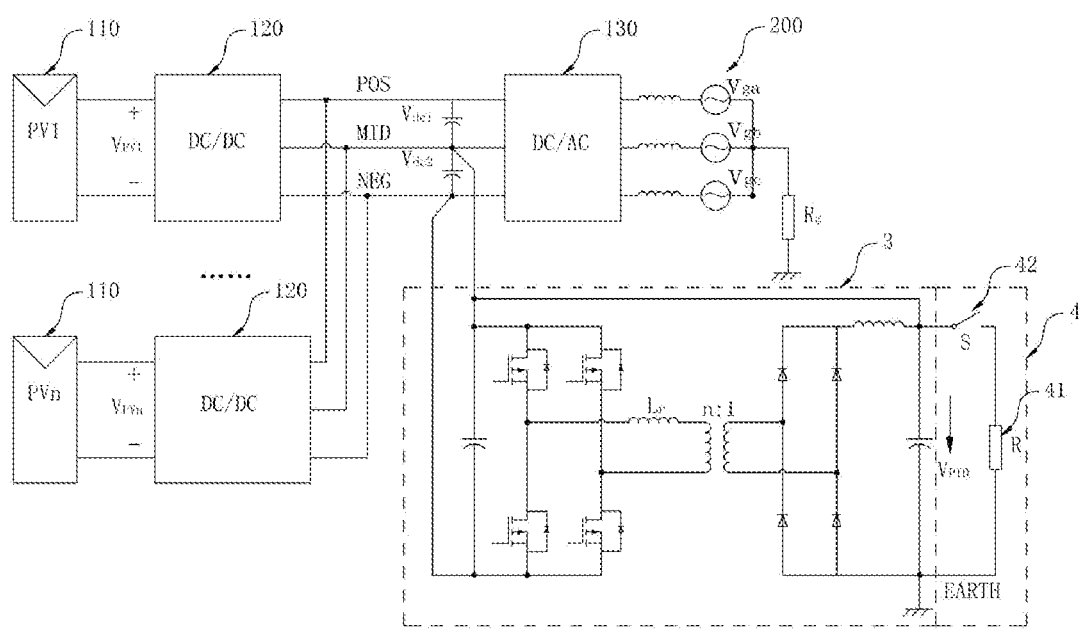
FIG. 10 is a schematic diagram of a circuit that the busbar voltage of a photovoltaic system is balanced in a first embodiment of the present disclosure.
Figure 12:
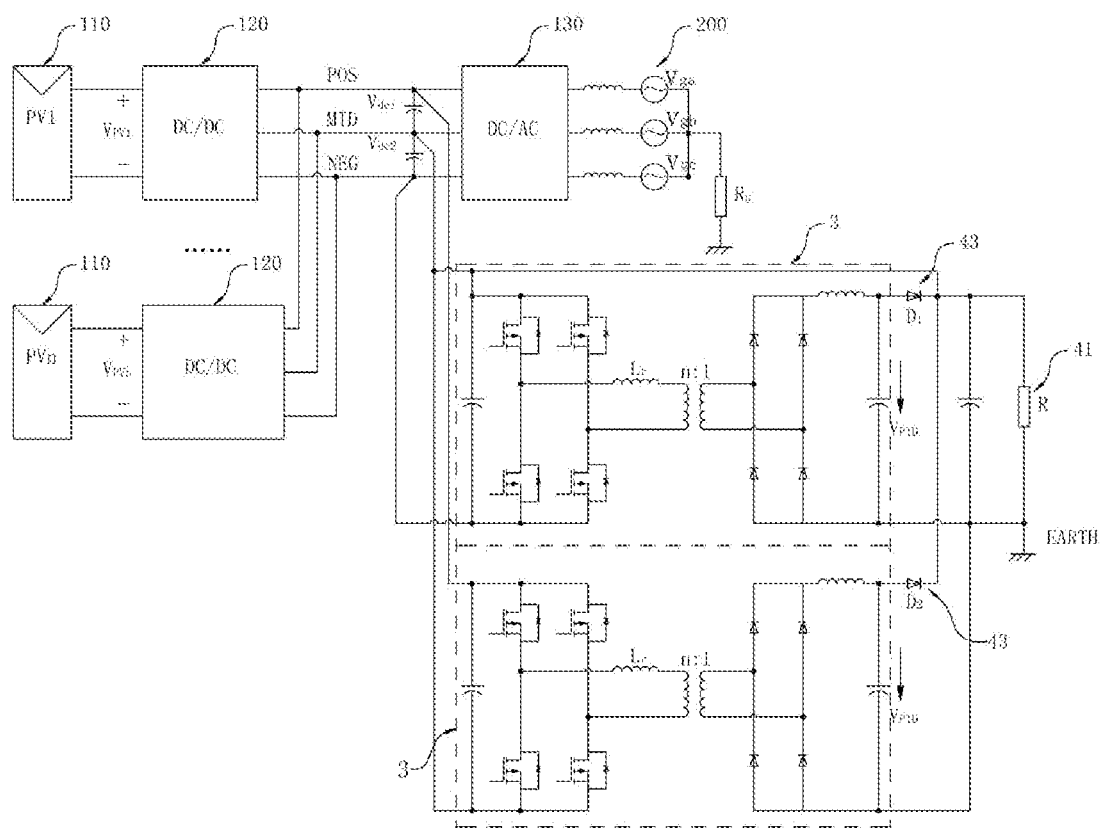
FIG. 12 is a schematic diagram of a circuit that the busbar voltage of a photovoltaic system is balanced in a third embodiment of the present disclosure.

The first construction method is an isolated and non-adjustable construction method. As shown in FIG. 5, FIG. 10 and FIG. 12, the voltage source topology module 3 includes a suppression circuit formed by connecting a full bridge circuit 33, a transformer 31 and an uncontrolled rectifier bridge 32. An input end of the suppression circuit is connected with busbars of the photovoltaic system 100, an output end 301 of the suppression circuit is connected with the busbar neutral points of the photovoltaic system 100, and a common earth end 302 of the suppression circuit is earthed, so that the busbar voltage of the photovoltaic system 100 forms the suppression voltage after passing through the full bridge circuit 33, the transformer 31 and the uncontrolled rectifier bridge 32.

For the second construction method, the power of the voltage source topology module 3 comes from the busbars, which can be positive busbars, negative busbars or full busbars. The full bridge circuit 33 includes four semiconductor switching devices S1, S2, S3, and S4 arranged in a bridge manner. The full bridge circuit 33 is pulsed at a constant duty ratio of 50%. As shown in FIG. 5, the pulses of field-effect tubes S1 and S4 are the same, and the pulses of field-effect tubes S2 and S3 are the same, so that the suppression voltage output by the suppression circuit is unadjustable. Since suppression voltage is unadjustable, the design of the transformer 31 is also very important. It is necessary to ensure that the suppression voltage is at least half of the output voltage of the photovoltaic panel group 110 under various operating conditions. Meanwhile, the power of the voltage source topology module 3 comes from the busbars, so the transformer 31 can be a high-frequency transformer selectively so as to adapt high-frequency alternating current generated after passing through the full bridge circuit 33. Moreover, compared with the first construction method, the volume of high-frequency transformer is smaller than that of an industrial frequency transformer.

Figure 6:
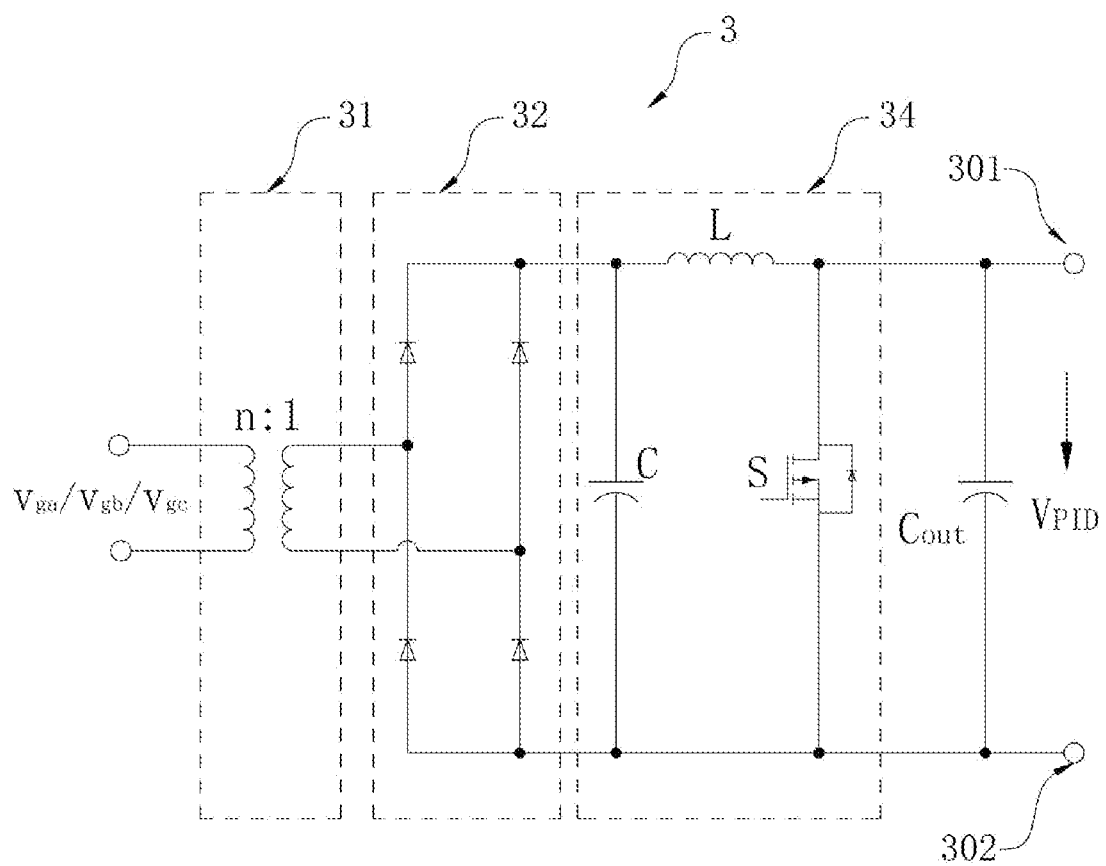
FIG. 6 is a schematic diagram of a circuit in a third construction manner of a voltage source topology module in the present disclosure.

The third construction method is an isolated and adjustable construction method. As shown in FIG. 6, based on the first construction method, a Boost circuit 34 is continued to be added. The Boost circuit 34 is connected to the output side of the uncontrolled rectifier bridge 32. Therefore, the voltage of the power grid 200 forms required suppression voltage after passing through the transformer 31, the uncontrolled rectifier bridge 32 and the Boost circuit 34, and the value of the suppression voltage can be changed by adjusting the duty ratio of the Boost circuit 34 to ensure that the suppression voltage output by the suppression circuit is at least half of the output voltage of the photovoltaic panel group 110 under various working conditions.

The fourth construction method is an isolated and adjustable construction method. The overall structure is similar to that in the second construction method, and the difference is that the full bridge circuit 33 operates in a phase-shifting mode, so that the suppression voltage output by the suppression circuit is adjustable to ensure that the suppression voltage output by the suppression circuit is at least half of the output voltage of the photovoltaic panel group 110 under various working conditions.

Figure 7:
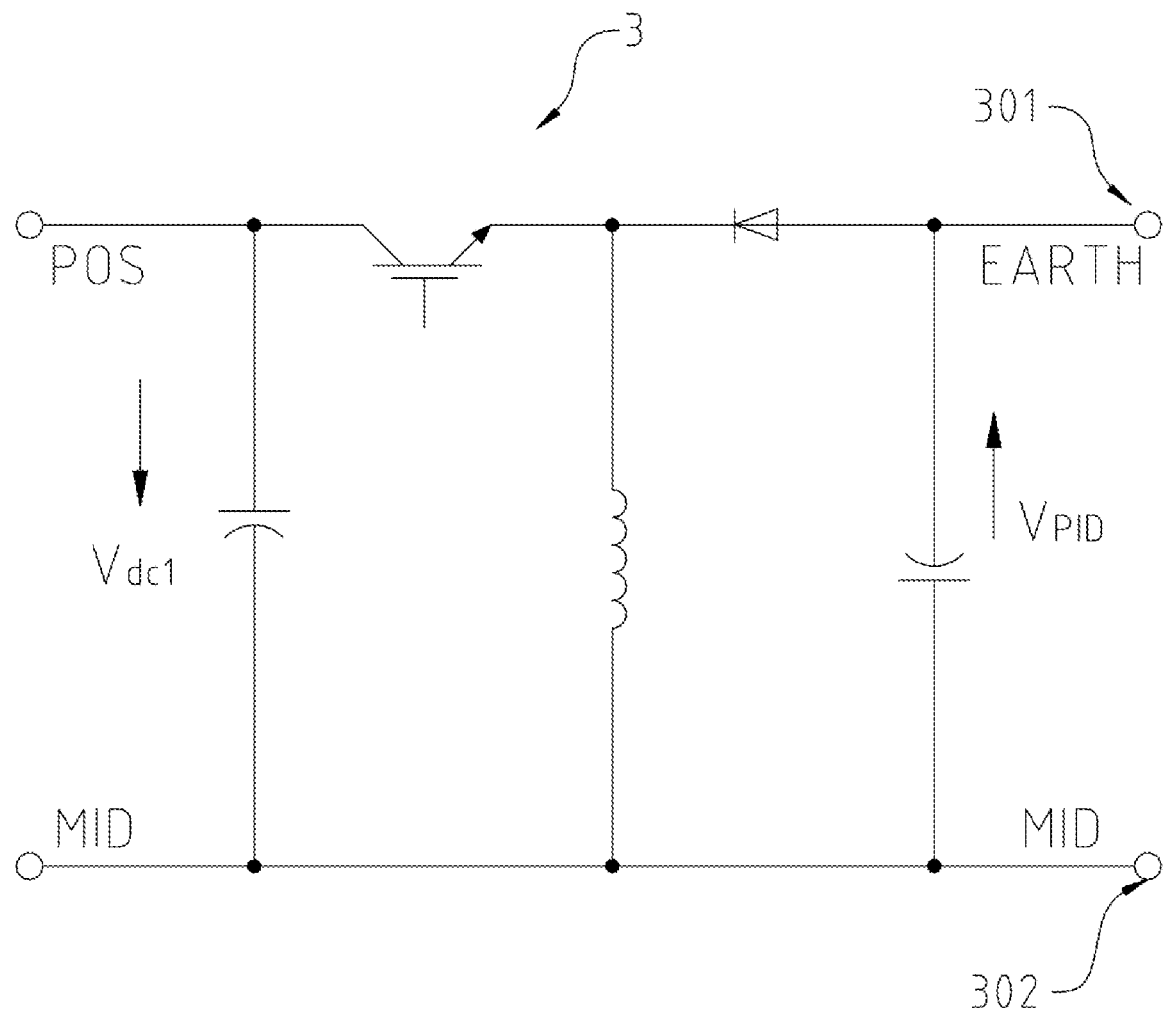
FIG. 7 is a schematic diagram of a circuit in a fifth construction manner of a voltage source topology module in the present disclosure.

The fifth construction method is a non-isolated and adjustable construction method. As shown in FIG. 7, the voltage source topology module 3 includes a suppression circuit formed by a Buck/Boost circuit. An input end of the suppression circuit is connected with positive busbars of the photovoltaic system 100, an output end 301 of the suppression circuit is earthed, and common earth points of the suppression circuit are connected to the busbar neutral points of the photovoltaic system 100.

For the fifth construction method, the input voltage and the output voltage of the suppression circuit can be inverted.

Figure 8:
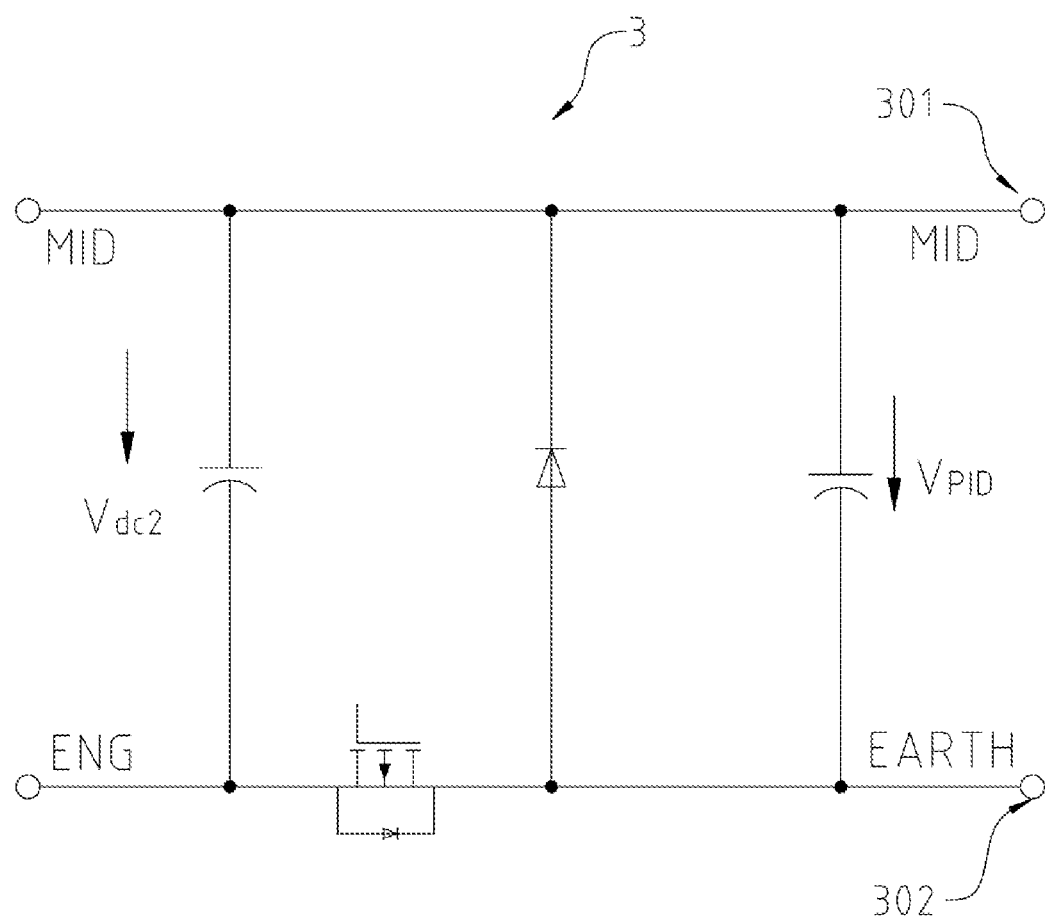
FIG. 8 a schematic diagram of a circuit in a sixth construction manner of a voltage source topology module in the present disclosure.

The sixth construction method is a non-isolated and adjustable construction method. As shown in FIG. 8, the voltage source topology module 3 includes a suppression circuit formed by a Buck circuit. An input end of the suppression circuit is connected with negative busbars of the photovoltaic system 100, an output end 301 of the suppression circuit is connected with busbar neutral points of the photovoltaic system 100, and common earth points of the suppression circuit are earthed, so that the potential of the busbar neutral points of the voltage source topology module 3 is improved by reducing the voltage of the negative busbars.

It is understandable that the specific circuit structures of the Buck/Boost circuit and the Buck circuit are well known to those skilled in the art, so the Buck/Boost circuit are not described in detail herein.

Meanwhile, compared with the prior art, the structure in the above six construction methods is relatively simple in structure and implementation mode, and can be more convenient for workers to use.

Figure 13:
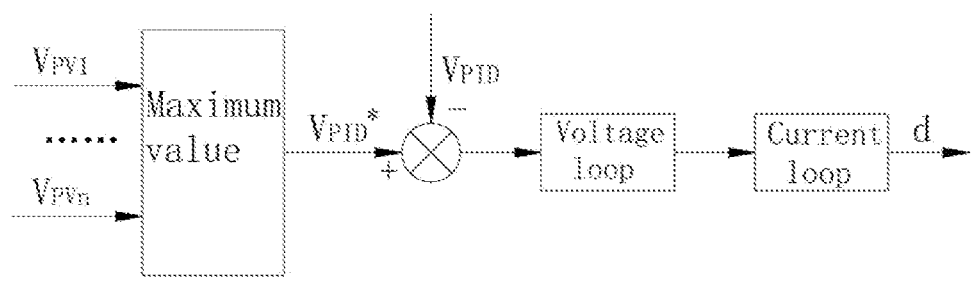
FIG. 13 is a logical flow chart when the duty ratio of a voltage source topology module is adjusted in the present disclosure.

In the embodiment, as shown in FIG. 13, when the suppression voltage output by the suppression circuit corresponding to the voltage source topology module 3 is adjustable, the voltage source topology module 3 also includes a detection module, so that the suppression circuit adjusts the value of the suppression voltage in real time according to a detection result of the detection module to ensure that the suppression voltage output by the suppression circuit is at least half of the output voltage of the photovoltaic panel group 110 under various working conditions.

Specifically, as shown in FIG. 13, the detection module includes an extraction unit, a comparison unit, a voltage loop and a current loop. The extraction unit is used for detecting and extracting the output voltages VPV1, . . . , VPVn of all the photovoltaic panel groups 110 in real time, and then selecting at least half of the maximum value VPVmax as a voltage instruction value VPID* of the suppression voltage VPID output by the suppression circuit, and sending the voltage instruction value VPID* to the comparison unit. At the same time, the suppression voltage VPID output by the current suppression circuit is also sent to the comparison unit for comparison with the voltage instruction value VPID*. Then, the comparison unit transmits the comparison result to the suppression circuit in the form of a duty ratio signal d after passing through the voltage loop and the current loop, so that the suppression circuit adjusts the value of the current suppression voltage according to the received duty ratio signal d to ensure that the suppression voltage output by the suppression circuit is at least half of the output voltage of the photovoltaic panel group 110 under various working conditions.

It is understandable that in the comparison unit, if the current suppression voltage VPID is greater than the voltage instruction value VPID*, the suppression voltage output by the current suppression circuit can satisfy the suppression of the PID effect. If the current suppression voltage VPID is less than the voltage instruction value VPID*, the suppression voltage output by the current suppression circuit cannot satisfy the suppression of PID effect. At this time, the suppression circuit needs to adjust the output suppression voltage according to the received duty ratio signal d to ensure that the suppression voltage VPID output by the current suppression circuit is greater than or equal to the voltage instruction value VPID*.

In the embodiment, when the PID effect is suppressed, the number of the voltage source topology modules 3 can be selected according to actual needs. For example, as shown in FIG. 9, the number of the voltage source topology modules 3 is one. For example, as shown in FIG. 10 to FIG. 12, the number of the voltage source topology modules 3 is a pair, and the two voltage source topology modules 3 can be mutually redundant, so that the suppression effect on the PID effect generated by the photovoltaic system 100 can be effectively improved.

Meanwhile, in the constructed voltage source topology modules 3, in order to balance the busbar voltage of the photovoltaic system 100 through connection with the balanced circuit 4, a power demand of the voltage source topology module 3 comes from the voltage of half busbars. Therefore, the voltage source topology module 3 satisfying the voltage balance conditions preferably adopts the second construction method, the fourth construction method, the fifth construction method and the sixth construction method. For convenience of understanding, the second construction method is taken as an example for description.

In one embodiment of the present disclosure, as shown in FIG. 10, the number of the voltage source topology modules 3 is one. The input end of the suppression circuit corresponding to the voltage source topology module 3 is connected with the positive busbars or the negative busbars of the photovoltaic system 100, and the balanced circuit 4 is connected between the output end 301 of the suppression circuit and the common earth end 302. When the photovoltaic system 100 operates, the voltage source topology module 3 can suppress the PID effect generated by the photovoltaic system 100. When the voltage of the positive busbars or the negative busbars of the photovoltaic system 100 is higher than a set action threshold value Vdcmax, the balanced circuit 4 can be connected with the suppression circuit, so that the balanced circuit 4 can reduce the voltage of the positive busbars or the negative busbars, and then the purpose of balancing the busbar voltage is achieved.

Figure 11:
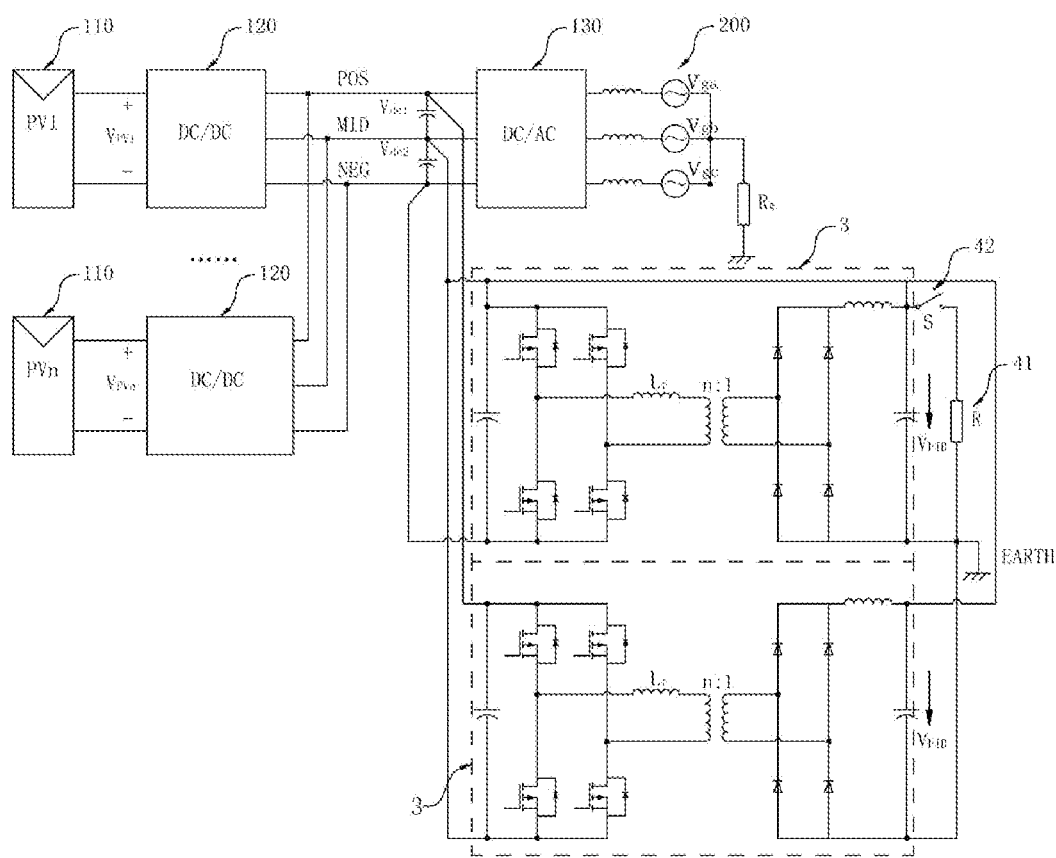
FIG. 11 is a schematic diagram of a circuit that the busbar voltage of a photovoltaic system is balanced in a second embodiment of the present disclosure.

Specifically, as shown in FIG. 10 to FIG. 12, the balanced circuit 4 includes a path unit and a load 41. When the voltage deviation occurs on the positive busbars or the negative busbars, the path unit can connect the load 41 in series with the corresponding suppression circuit, so that according to the voltage division principle of the series circuit, the load 41 can absorb the energy of the positive busbars or the negative busbars, and then the deviation voltage of the positive busbars or the negative busbars is adjusted. Wherein, the load 41 is the prior art, and a resistor can generally be selected.

It is understandable that the embodiment can only reduce and adjust the voltage of singly positive busbars or negative busbars, but cannot realize the voltage adjustment of all busbars.

In view of the problem that only single busbar adjustment can be carried out in the above embodiments. The present disclosure may provide improved embodiments including but not limited to the two following improved embodiments.

In the first improved embodiment, as shown in FIG. 12, the path unit includes a pair of diodes 43. The number of the voltage source topology modules 3 is two, an input end of the suppression circuit corresponding to one voltage source topology module 3 is connected to the positive busbars, and an input end of the suppression circuit corresponding to the other voltage source topology module 3 is connected to the negative busbars. The diodes 43 are installed at the output ends 301 of the two suppression circuits, and the output ends 301 of the two suppression circuits and the common earth end 302 are connected in parallel through the load 41. During the normal operation of the photovoltaic system 100, the two suppression circuits are mutually redundant to improve the reliability of the circuits, and then the suppression effect on the PID effect is improved. When deviation occurs on the voltage of the positive busbars or the negative busbars, the suppression circuit corresponding to the busbars without voltage deviation is turned off through the corresponding diode 43, so that the balanced circuit 4 is connected with the suppression circuit corresponding to the busbars with voltage deviation, and then the voltage of the positive busbars or the negative busbars is balanced.

Specifically, when the voltage values=of the positive and negative busbars is higher than the action threshold value Vdcmax, the suppression circuit connected to the positive busbars can be set as a first circuit, and the suppression circuit connected to the negative busbars can be set as a second circuit. If high deviation occurs on the voltage of the positive busbars, the reference of the suppression voltage output by the first circuit can be raised, so that the suppression voltage output by the second circuit is smaller than the suppression voltage output by the first circuit. At this time, the diode 43 installed on the second circuit is turned off, so that the diode 43 installed on the first circuit is turned on. Thus, the load 41 is equivalently connected in series with the first circuit, and then the load 41 can absorb energy from the positive busbars, so that the voltage of the positive busbars is reduced. When the voltage of the positive busbars is reduced to be equal to the voltage of the negative busbars, the balanced circuit 4 is disconnected from the first circuit through the selector switch 42. Similarly, the regulation process when high deviation occurs on the negative busbar voltage can be obtained.

In the second improved embodiment, as shown in FIG. 11, the path unit is a selector switch 42, and the selector switch 42 and the load 41 are connected in series to form a balanced circuit 4. The number of the voltage source topology modules 3 is two, an input end of the suppression circuit corresponding to one voltage source topology module 3 is connected to the positive busbars, and an input end of the suppression circuit corresponding to the other voltage source topology module 3 is connected to the negative busbars. The output ends 301 of the two suppression circuits and the common earth end 302 are connected in parallel through the balanced circuit 4. During the normal operation of the photovoltaic system 100, the two suppression circuits are mutually redundant to improve the reliability of the circuits, and then the suppression effect on the PID effect is improved. When the voltage value of the positive busbars or the negative busbars is higher than the action threshold value Vdcmax, the voltage value of the positive busbars or the negative busbars with high deviation is reduced through the connection of the balanced circuit 4. When the voltage value of the positive busbars or the negative busbars is lower than the action threshold value Vdcmin, the voltage value of the positive busbars or the negative busbars with low deviation is increased through the connection of the balanced circuit 4. That is, no matter high deviation or low deviation of the positive and negative busbars, the voltage of the positive and negative busbars is kept between the action threshold value Vdcmax and the action threshold value Vdcmin through the connection of the balanced circuit 4.

Specifically, when the voltage value of the positive and negative busbars is higher than the action threshold value Vdcmax or lower than the action threshold value Vdcmin, the balanced circuit 4 switches on the load 41 and the suppression circuit through the selector switch 42. That is, at this time, the outputs of the two suppression circuits are directly connected in parallel. If high deviation occurs on the voltage value of the positive busbars, the output power of the suppression circuit connected with the positive busbars is increased. That is, the load 41 absorbs energy from the positive busbars, so that the voltage of the positive busbars is decreased. At this time, the output power of the negative busbars is correspondingly decreased, so that the voltage of the negative busbars is relatively increased until the voltage of the positive and negative busbars reaches balance. If low deviation occurs on the voltage value of the positive busbars, the output power of the suppression circuit connected with the positive busbars is decreased. That is, the load 41 absorbs energy from the negative busbars, so that the voltage of the positive busbars is increased. Meanwhile, the voltage of the negative busbars is decreased until the voltage of the positive and negative busbars reaches balance. Similarly, the voltage regulation process voltage of the negative busbars can be obtained.

It is understandable that the selector switch 42 is the prior art, and is generally a contactor, an air switch or a controllable electronic switch.

The basic principles, principal features and advantages of the present disclosure are shown and described above. Those skilled in the art should understand that the present disclosure is not limited by the above-described embodiments, the above-described embodiments and specification are merely illustrative of the principles of the present disclosure, various changes and modifications may occur to the present disclosure under the premise of without departing from the spirit and scope of the present disclosure, and these changes and modifications fall within the scope of the present disclosure as claimed. The scope of the present disclosure is defined by the appended claims and equivalents thereof.

What is claimed is:

1. A PID (Potential Induced Degradation) effect suppression system, comprising:
    a photovoltaic system; the photovoltaic system is connected with a power grid;
    at least one voltage source topology module; an output end of the voltage source topology module is connected with busbar neutral points of the photovoltaic system; a common earth end of the voltage source topology module is earthed, and then the potential to earth of a photovoltaic panel group in the photovoltaic system is improved through the suppression voltage output by the voltage source topology module; wherein, the suppression voltage is at least ½ of the output voltage of the photovoltaic panel group;
    a balanced circuit; when the voltage source topology module gets power from busbars, the balanced circuit can be connected between the output end of the voltage source topology module and the common earth end; if deviation occurs on the busbar neutral point voltage of the photovoltaic system, the balanced circuit is suitable for being connected with the voltage source topology module, and then the deviation voltage of the busbars can be effectively balanced;
    the balanced circuit comprises a path unit and a load; when voltage deviation occurs on positive busbars or negative busbars, the path unit is suitable for connecting the load with a suppression circuit formed by the corresponding voltage source topology module.

2. The PID effect suppression system according to claim 1, wherein the photovoltaic system comprises a plurality of photovoltaic panel groups and an inverter; the photovoltaic panel groups are connected to an input end of the inverter through the same busbar by means of a DC/DC (Direct Current/Direct Current) converter, and an output end of the inverter is connected to the power grid; and the output end of the voltage source topology module is directly connected with the busbar neutral points of the photovoltaic system.

3. The PID effect suppression system according to claim 1, wherein the photovoltaic system comprises a plurality of photovoltaic panel groups and a plurality of inverters; the photovoltaic panel groups are connected with the corresponding inverters through busbars by means of a DC/DC converter to form photovoltaic circuits, and the photovoltaic circuits are connected to the power grid in parallel; the output end of the voltage source topology module is connected with busbar neutral points of each photovoltaic circuit by means of control switches; and when the voltage source topology module operates, one of the control switches is closed, and the rest of the control switches keep disconnected.

4. The PID effect suppression system according to claim 1, wherein the voltage source topology module comprises a suppression circuit formed by connecting a transformer and an uncontrolled rectifier bridge; an input end of the suppression circuit is connected with the power grid, an output end of the suppression circuit is connected with the busbar neutral points of the photovoltaic system, and a common earth end of the suppression circuit is earthed, so that the voltage of the power grid forms the suppression voltage after passing through the transformer and the uncontrolled rectifier bridge.

5. The PID effect suppression system according to claim 4, wherein the suppression circuit also comprises a Boost circuit, the Boost circuit is connected to an output side of the uncontrolled rectifier bridge so that the voltage of the power grid forms the suppression voltage after passing through the transformer, the uncontrolled rectifier bridge and the Boost circuit, and the value of the suppression voltage can be adjusted to a suitable value by regulating the duty ratio of the Boost circuit.

6. The PID effect suppression system according to claim 1, wherein the voltage source topology module comprises a suppression circuit formed by connecting a full bridge circuit, a transformer and an uncontrolled rectifier bridge in sequence; an input end of the suppression circuit is connected with busbars of the photovoltaic system, an output end of the suppression circuit is connected with busbar neutral points of the photovoltaic system, and a common earth end of the suppression circuit is earthed, so that the busbar voltage of the photovoltaic system forms the suppression voltage after passing through the full bridge circuit, the transformer and the uncontrolled rectifier bridge.

7. The PID effect suppression system according to claim 1, wherein the voltage source topology module comprises a suppression circuit formed by a Buck/Boost circuit; an input end of the suppression circuit is connected with positive busbars, an output end of the suppression circuit is earthed, and common earth points of the suppression circuit are connected to the busbar neutral points of the photovoltaic system;
    or, the voltage source topology module comprises a suppression circuit formed by a Buck circuit; an input end of the suppression circuit is connected with negative busbars, an output end of the suppression circuit is connected with busbar neutral points of the photovoltaic system, and common earth points of the suppression circuit are earthed.

8. The PID effect suppression system according to claim 1, wherein the path unit is a selector switch, and the selector switch is connected with the load in parallel; the number of the voltage source topology modules is two, an input end of the suppression circuit corresponding to one voltage source topology module is connected to the positive busbars, and an input end of the suppression circuit corresponding to the other voltage source topology module is connected to the negative busbars; the output ends of the two suppression circuits and the common earth end are connected in parallel through the balanced circuit; and when deviation occurs on the voltage of the positive busbars or the negative busbars, the balanced circuit is connected by turning on and off the selector switch, and then the voltage of the negative busbars or the negative busbars is balanced.

9. The PID effect suppression system according to claim 1, wherein the path unit comprises a pair of diodes; the number of the voltage source topology modules is two, an input end of the suppression circuit corresponding to one voltage source topology module is connected to the positive busbars, and an input end of the suppression circuit corresponding to the other voltage source topology module is connected to the negative busbars; the diodes are installed at the output ends of the two suppression circuits, and two output ends of the suppression circuit and the common earth end are connected in parallel through the load; and when high deviation occurs on the voltage of the positive busbars or the negative busbars, the suppression circuit corresponding to the busbars without high voltage deviation is turned off through the corresponding diode, so that the balanced circuit is connected with the suppression circuit corresponding to the busbars with high voltage deviation, and then the voltage of the positive busbars or the negative busbars is balanced.

* * * * *